United States Patent
Rachlin et al.

(10) Patent No.: US 11,237,940 B2
(45) Date of Patent: Feb. 1, 2022

(54) DETERMINING DYNAMIC SYSTEM PERFORMANCE FROM A STATIC BEHAVIOR MODEL

(71) Applicant: Honeywell International Inc., Morris Plains, NJ (US)

(72) Inventors: Elliott Rachlin, Scottsdale, AZ (US); James M. Schreder, Perkasie, PA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 240 days.

(21) Appl. No.: 16/695,543

(22) Filed: Nov. 26, 2019

(65) Prior Publication Data

US 2021/0157706 A1  May 27, 2021

(51) Int. Cl.
*G06F 11/34* (2006.01)
*G06F 9/50* (2006.01)
*G06F 30/20* (2020.01)

(52) U.S. Cl.
CPC .......... *G06F 11/3447* (2013.01); *G06F 9/505* (2013.01); *G06F 30/20* (2020.01)

(58) Field of Classification Search
None
See application file for complete search history.

(56) References Cited

U.S. PATENT DOCUMENTS

| | | | |
|---|---|---|---|
| 5,477,474 A | 12/1995 | Southgate et al. | |
| 11,055,454 B1* | 7/2021 | Gasser | G06F 9/45558 |
| 2007/0064784 A1 | 3/2007 | Dehghan et al. | |
| 2016/0154907 A1* | 6/2016 | Halabe | E21B 43/00 703/7 |
| 2020/0322809 A1* | 10/2020 | Zhao | H04W 16/18 |

OTHER PUBLICATIONS

Ruhle, "Dynamic Modeling Using the Graphical Model Builder (GMB)," Siemens, 6 pages, Sep. 2006.
"Graphical Dynamic Model Software," Electrical Power System Analysis & Operation Software, 4 pages, 2019.

* cited by examiner

*Primary Examiner* — Craig C Dorais
(74) *Attorney, Agent, or Firm* — Seager, Tufte & Wickhem, LLP

(57) ABSTRACT

A method of modeling dynamic system performance includes enabling a user to create a user-defined static behavior model of a user-defined system of computers, networks and/or bridges. A library of blocks is provided that each represent a computer, a network and/or a bridge for the user to use in defining a user-defined static behavior model, at least some of the blocks in the library of blocks may include one or more block parameters that are user definable. The static behavior model is automatically converted into a dynamic behavior model that is compatible with a simulator and is read into the simulator. A plurality of Monte-Carlo simulations are run on the dynamic behavior model to produce a plurality of simulation outputs, which are analyzed and the analyzed results are outputted.

20 Claims, 6 Drawing Sheets

DETERMINING DYNAMIC SYSTEM PERFORMANCE FROM A STATIC BEHAVIOR MODEL

TECHNICAL FIELD

The present disclosure relates generally to modeling the behavior of computer networks and more particularly to using a static behavior model to determine dynamic system performance of a computer network.

BACKGROUND

Computer networks can include a number of servers and connections between servers. When designing a computer network, or modifying an existing computer network, it is desirable to analyze the computer network to look for bottlenecks in the computer network and/or components that have excessive capacity. A bottleneck can, for example, be a point (such as a particular computer server, network section or bridge) at which demand for a resource exceeds the available supply of the resource. Analyzing such computer networks can be done by creating and then simulating a dynamic behavioral model of the computer network. However, creating such dynamic behavioral models can be complex, and often requires specialized coding knowledge in the particular computer language understandable by the simulator. This is often beyond the ability of a casual computer network analyst.

What would be desirable is a system that allows a user to easily create a static behavior model of the computer network that is similar to a standard computer network topology diagram, automatically convert the static behavior model into a dynamic behavior model suitable for simulating on a dynamic simulator, and then automatically simulating the dynamic behavior model using automatically generated randomized loads.

SUMMARY

The present disclosure relates generally to a system that allows a user to easily create a static behavior model of a computer network that is similar to a standard computer network topology diagram, automatically converts the static behavior model into a dynamic behavior model suitable for simulating on a dynamic simulator, and then automatically simulating the dynamic behavior model using automatically generated randomized loads. As a particular example, a method of modeling dynamic system performance of a user-defined static behavior model may include providing a user interface that enables a user to create the user-defined static behavior model of a user-defined system of computers, networks and/or bridges. A library of building blocks may be provided that each represent a computer, a network and/or a bridge for the user to use in defining the user-defined static behavior model. The user selects and places blocks from the library of blocks and connects them similar to creating a standard computer network topology diagram to define the user-defined static behavior model. At least some of the blocks in the library of blocks include one or more block parameters, some of which are user definable. The one or more block parameters may define certain characteristics of the block, such as the number of messages per second output by the block, the number messages per second that can be processed by the block, a message queue size of the block, etc. More generally, the block parameters may define, for example, a load presented by the block to another connected blocks, a processing capacity for processing a load, and/or any other suitable characteristic.

Once the static behavior model is completed, the static behavior model may be automatically converted into a dynamic behavior model that is compatible with a simulator. At least some of the block parameters of the blocks of the static behavior model are used in defining the dynamic behavior model. The dynamic behavior model may then be read into a simulator. A plurality of Monte-Carlo simulations may be run on the dynamic behavior model to produce a plurality of simulation results. The plurality of simulation results and then analyzed to identify one or more resource usage flags in the user-defined system of computers, networks and/or bridges, and the analyzed results are outputted.

As another example, a system for modeling dynamic system performance of a user-defined system that include a plurality of computers that are operably coupled via communication connections includes a user interface and a processing unit that is operably coupled to the user interface. The processing unit is configured to accept from the user via the user interface a user-defined static behavior model for the user-defined system, convert the user-defined static behavior model into a dynamic behavior model, run a plurality of Monte-Carlo simulations on the dynamic behavior model to produce a plurality of simulation outputs, analyze the plurality of simulation outputs to identify one or more resource usage flags for one or more of the plurality of computers and/or communication connections of the user-defined system; and output the analyzed results.

As another example, a non-transient, computer-readable storage medium has instructions stored thereon that when executed by a computer system cause the computer system to provide a user interface that enables a user to create a user-defined static behavior model of a user-defined system of computers, networks and/or bridges, provide a library of blocks that each represent a computer, a network and/or a bridge for the user to use in defining the user-defined static behavior model, wherein the user connects selected blocks of the library of blocks to define the user-defined static behavior model, at least some of the blocks in the library of blocks include one or more block parameters that are user definable, convert the user-defined static behavior model into a dynamic behavior model that is compatible with a simulator, read the dynamic behavior model into the simulator, run a plurality of Monte-Carlo simulations on the dynamic behavior model to produce a plurality of simulation outputs, analyze the plurality of simulation outputs to identify one or more resource usage flags in the user-defined system of computers, networks and/or bridges, and output the analyzed results.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
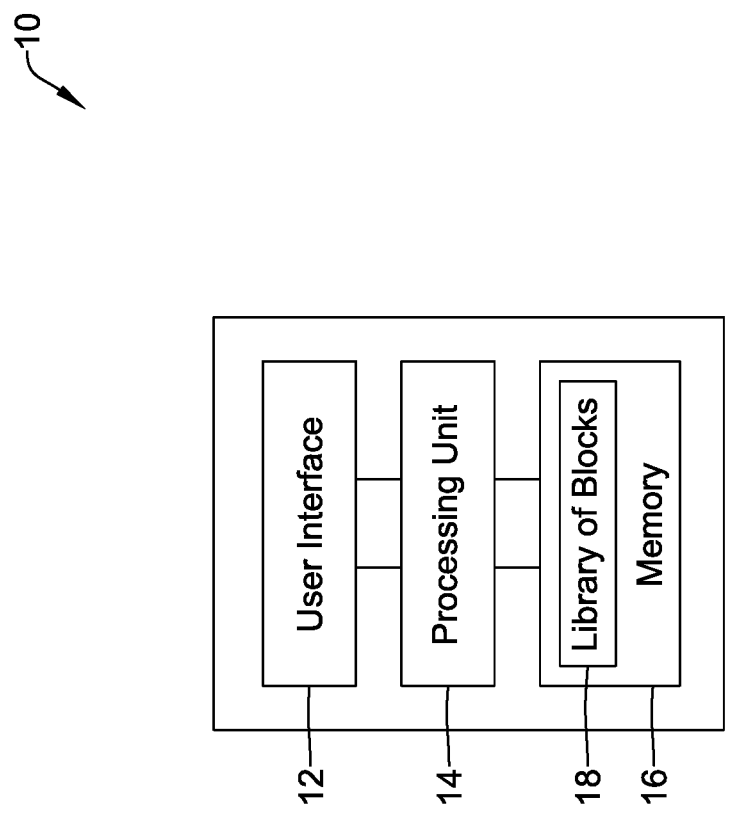
FIG. 1 is a schematic block diagram of an illustrative system for modeling dynamic system performance of a user-defined system that includes a plurality of interconnected computers.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative system 10 for modeling dynamic system performance of a user-defined system that includes a plurality of computers. The illustrative system 10 includes a user interface 12 and a processing unit 14 that is operably coupled to the user interface 12. It will be appreciated that in some cases, the processing unit 14 may represent part of a personal computer and/or a cloud-based computer. A memory 16 is operably coupled to the processing unit 14 and includes a library of blocks 18. The memory 16 may be manifested within a personal computer and/or a cloud-based computer, for example. The library of blocks 18 may be provided to the user interface 12 in such a way as to permit a user to utilize the library of blocks 18 in building a user-defined static behavior model for the user-defined system.

In some cases, for example, the user interface 12 may be configured to enable the user to use the library of blocks 18 to define the user-defined static behavior model. The library of blocks 18 may, for example, include icons representing the various elements of a computer system, including but not limited to individual computers, servers, network connections and bridges. The library of blocks 18 enable a user to easily and intuitively create the user-defined static model by dragging and dropping individual icons from a list of icons onto a displayed workspace, connecting the icons in a manner similar to creating a standard computer network topology diagram. In some cases, at least some icons include one or more predefined parameters, sometimes known as block parameters, that provide the system 10 with additional information as to how the equipment or hardware represented by that particular icon actually functions, and/or includes information pertaining to how to dynamically model the equipment or hardware represented by that particular icon. In some cases, one or more of the block parameters are user definable. In some cases, the one or more block parameters may define certain characteristics of the block, such as the number of messages per second output by the block, the number messages per second that can be processed by the block, a message queue size of the block, etc. More generally, the block parameters may define, for example, a load presented by the block to another connected blocks, a processing capacity for processing a load, and/or any other suitable characteristic. Some, all or none of these may be user definable. In some cases, the system 10 may utilize one or more spreadsheets to organize and store this information. In some cases, the dynamic behavior model may be created in a user friendly graphical editor such as Microsoft Visio™, with a custom stencil that includes the library of building blocks.

The processing unit 12 is configured to accept from the user via the user interface 12 the user-defined static behavior model for the user-defined system and to convert the user-defined static behavior model into a dynamic behavior model. In some cases, the dynamic behavior model is configured to model resource utilization of one or more of the computers, networks and/or bridges of the user-defined system based on a simulated load. The modeled resource utilization may include, for example, bandwidth, Central Processing Unit (CPU) usage, disk space usage, memory usage, message queue usage, average wait time, average queue length, network capacity and/or any other suitable parameter. These are just examples.

The processing unit 12 may be configured to run a plurality of Monte-Carlo simulations on the dynamic behavior model to produce a plurality of simulation outputs and to analyze the plurality of simulation outputs to identify one or more resource usage flags for one or more of the plurality of computers and/or communication connections of the user-defined system. In running a plurality of Monte-Carlo simulations, the processing unit 12 may vary one or more stimuli (e.g. loads) that are presented to the dynamic behavior model. These stimuli may, for example, be uncorrelated across the plurality of Monte-Carlo simulations. In some cases, at least some of the one or more stimuli reflect a load placed on the user-defined system by one or more of the components of the user-defined system. As an example, the load may represent a rate of messages generated and transmitted by one or more of the computers within the user-defined system.

Analyzing the plurality of simulation outputs may include identifying one or more resource usage flags. The resource usage flags may, for example, include a resource overload condition on one or more of the computers, networks and/or bridges that are in the user-defined system. The resource usage flags may also include a resource underload condition. In some cases, resource usage may refer to the bandwidth necessary to transmit and/or process the message presented to the resource. A resource usage flag may correspond to when a demand for one or more of the model resource utilization comes within a predetermined margin of a supply for the corresponding resource. The analyzed results may be outputted via the user interface 12. This may, for example, include a report on where there may be bottlenecks within the user-defined system and in some cases the conditions under which the bottleneck occurs. In some cases, the dynamic behavior model may be generated and/or the simulations may be run using Simulink™, which is a MATLAB™ based graphical programming environment for modeling, simulating and analyzing multi-domain dynamical systems.

Figure 2:
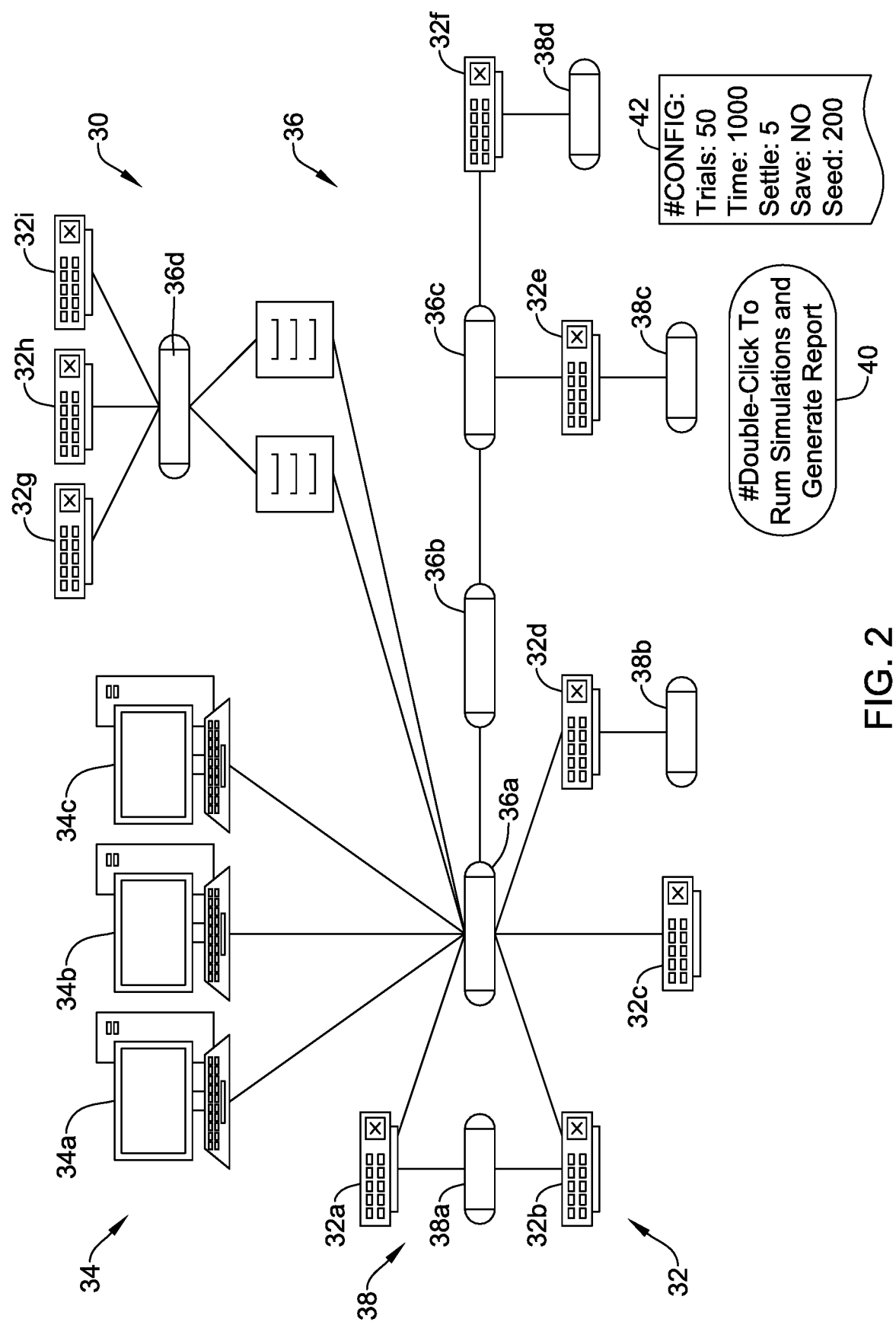
FIG. 2 is a schematic block diagram of a user-defined system that includes a plurality of interconnected computers.

FIG. 2 provides an example of a user-defined static behavior model 30 that represents a user-defined system. The static behavior model 30 may be created by sequentially dragging representative blocks onto a workspace (such as in Visio™), and optionally inputting additional information such as performance parameters and other parameters for one or more of the blocks into the system 10. Once all the blocks are placed, for example, the network blocks and/or bridge blocks may be placed on the workspace, and appropriately interconnected with the other components. As illustrated, the user-defined static behavior model 30 includes a number of computers 32, individually labeled as 32a, 32b, 32c, 32d, 32e, 32f, 32g, 32h and 32i and a number of computers 34, individually labeled as 34a, 34b and 34c. A number of networks 36, individually labeled as 36a, 36b, 36c and 36d connect the individual computers 32 and 34 to each other. As shown, the user-defined static behavior model 30 also includes components 38, individually labeled as 38a, 38b, 38c and 38d.

In the example shown, the user-defined static behavior model 30 also includes a start button 40. Once the user is satisfied that they have correctly entered the user-defined static behavior model 30, including entering any necessary changes to predefined parameters, the user may utilize the start button 40 to instruct the system 10 to translate the user-defined static behavior model 30 into a dynamic behavior model that the processing unit 14 will use to run a number of Monte-Carlo simulations. The user-defined static behavior model 30 may also include an information icon 42 that displays some of the criteria that will be used in running the number of Monte-Carlo simulations, including a number of trials to be run, a time parameter, and an initial seed value. Monte-Carlo simulations rely on repeated random sampling to obtain numerical results. An underlying concept is to use randomness to solve problems that might be deterministic in principle.

Figure 3:
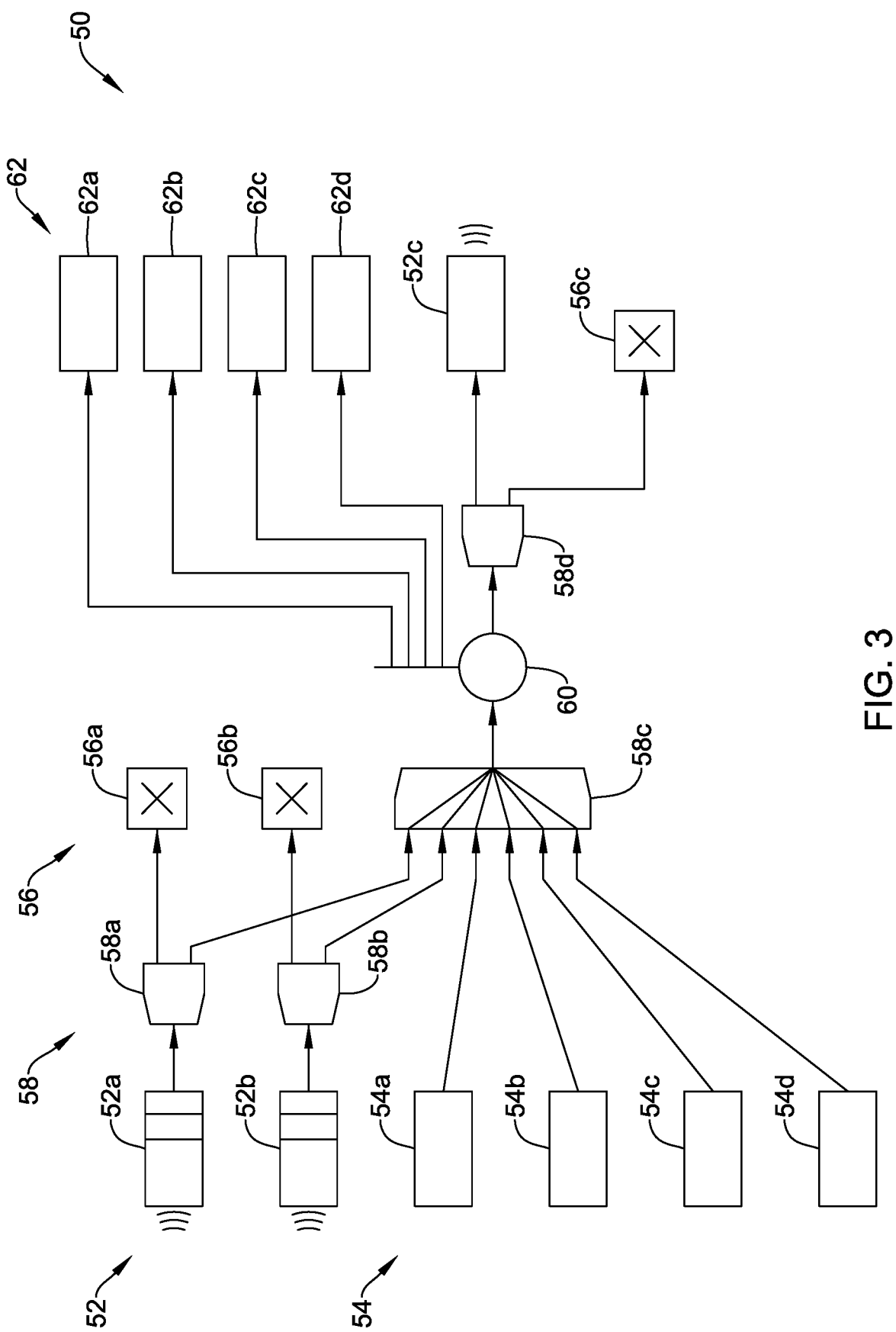
FIG. 3 is a schematic block diagram showing how one of the computers in FIG. 2 may be dynamically modeled.

While the user-defined static behavior model 30 has a number of components illustrated, it will be appreciated that the user-defined static behavior model 30 is easily and intuitively constructed by the user by dragging and dropping the individual blocks onto the workspace. As noted above, the user-defined static behavior model 30 may be created using a software program such as but not limited to Visio™. Customized stencils that include the appropriate blocks may be uploaded into the software program. Once the user-defined static behavior model 30 is finalized, the processing unit 14 may translate the static behavior model into a dynamic behavior model, sometimes in response to the user selecting the start button 40. In some cases, the dynamic behavior model is much more technically complicated than the static behavior model. As a simple example, FIG. 3 shows a dynamic behavior model 50 that corresponds to a single computer 32 as shown in FIG. 2. It can be appreciated, based just on the dynamic behavior model 50, just how complicated the dynamic behavior model corresponding to the entirety of the user-defined static behavior model 30 might be. Also, the dynamic behavior model must be decomposed into lines of computer code that are suitable for execution by the simulator. This further complicates the dynamic behavior model relative to the user-defined static behavior model 30. It will be appreciated that a single network or bridge shown in the user-defined static behavior model translates into a similar complexity when the dynamic behavior model is created by the system. As an example, each individual block on the user-defined static behavior model 30 may turn into, on average, 15 or more distinct Simulink™ blocks in the corresponding dynamic behavior model. The user creates the static behavior model, the system automatically creates the dynamic behavior model.

In FIG. 3, the dynamic behavior model 50 (for a single computer) includes several broadcaster and receivers 52, individually labeled as 52a, 52b and 52c. The dynamic model 50 includes several entity creators 54, individually labeled as 54a, 54b, 54c and 54d. The entity creators 54 generate the entities (e.g. messages) moving through the dynamic behavior model 50. Entities represent demand for a resource such as CPU usage, bandwidth, queues, buffers and the like. The individual computers 32, 34 provide supply for these resources. Entity terminators 56, individually labeled as 56a, 56b and 56c, terminate entities. The dynamic behavior model 50 includes several switches 58, individually labeled as 58a, 58b, 58c and 58d, which control the flow of information through the dynamic behavior model 50. A network 60 sits between the switch 58c and 58d. The dynamic behavior model 50 includes several file I/O blocks 62, individually labeled as 62a, 62b, 62c and 62d. It will be noted that some of the blocks are connected with single lines while others are connected with double lines. Single lines represent continuous signal paths while double lines represent a path that an entity traverses.

Figure 4:
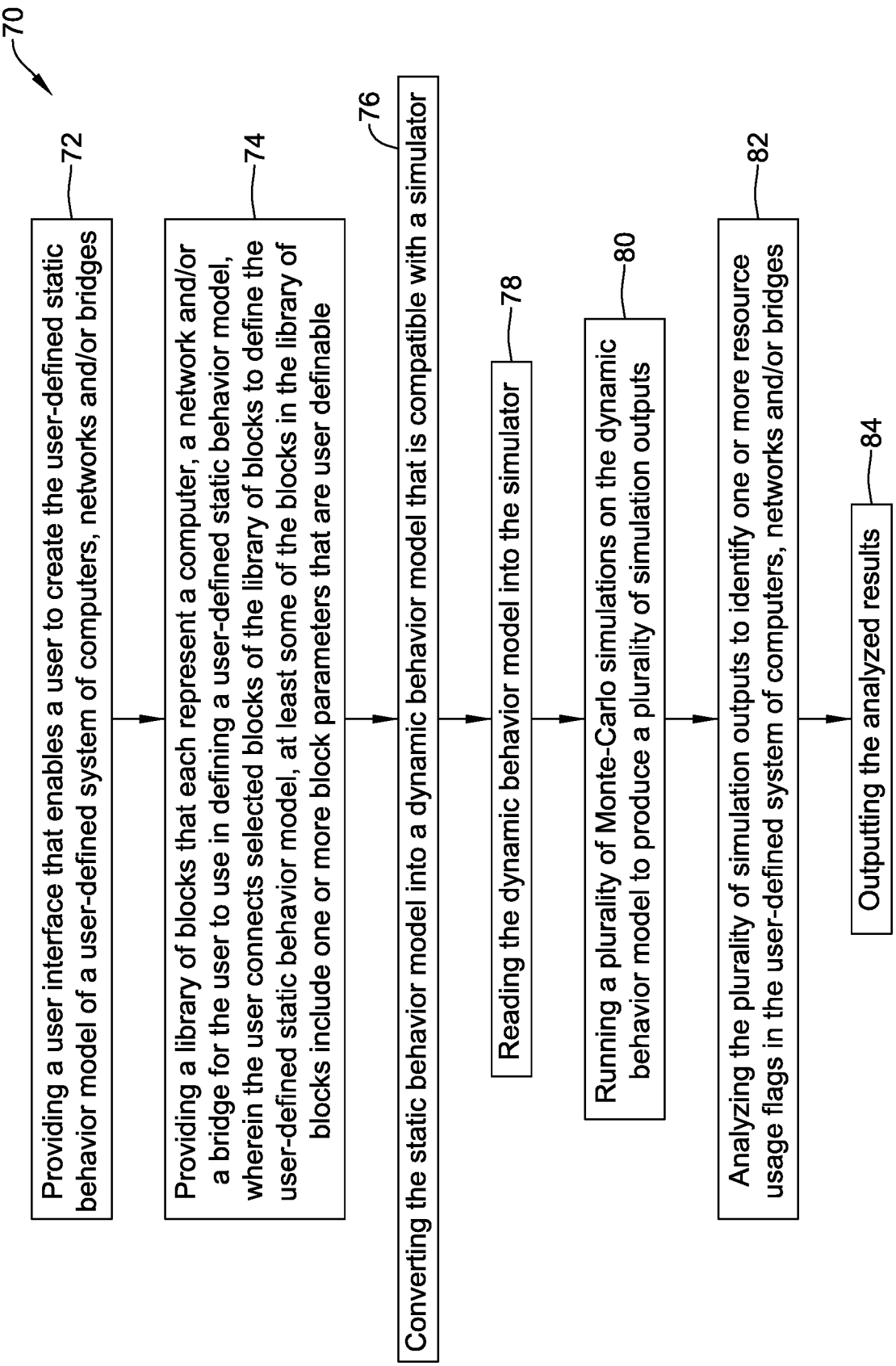
FIG. 4 is a flow diagram showing an illustrative method of modeling dynamic system performance of a user-defined static behavior model.

FIG. 4 is a flow diagram showing a method 70 of modeling dynamic system performance of a user-defined static behavior model. A user interface is provided that enables a user to create the user-defined static behavior model of a user-defined system of computers, networks and/or bridges, as indicated at block 72. A library of blocks that each represent a computer, a network and/or a bridge are provided for the user to use in defining a user-defined static behavior model, wherein the user connects selected blocks of the library of blocks to define the user-defined static behavior model, at least some of the blocks in the library of blocks include one or more block parameters that are user definable, as indicated at block 74. In some cases, the one or more block parameters of one or more blocks in the user-defined static behavior model are used in defining the dynamic behavior model. The one or more block parameters of one or more blocks in the user-defined static behavior model may also be used in defining stimuli for the plurality of Monte-Carlo simulations.

The static behavior model is converted into a dynamic behavior model that is compatible with a simulator, as indicated at block 76 and is read into the simulator as indicated at block 78. A plurality of Monte-Carlo simulations are run on the dynamic behavior model to produce a plurality of simulation outputs, as indicated at block 80. The plurality of simulation outputs are analyzed to identify one or more resource usage flags in the user-defined system of computers, networks and/or bridges, as indicated at block 82. The one or more resource usage flags may include a resource overload condition of one or more of the computers, networks and/or bridges in the user-defined system. In some cases, the one or more resource usage flags include a resource underload condition of one or more of the computers, networks and/or bridges in the user-defined system.

In some cases, the plurality of Monte-Carlo simulations vary one or more stimuli presented to the dynamic behavior model, wherein the one or more stimuli are uncorrelated across the plurality of Monte-Carlo simulations. The one or more stimuli may be based on a seed value. In some cases, the plurality of Monte-Carlo simulations vary one or more stimuli presented to the dynamic behavior model, wherein at least some of the one or more stimuli reflect a load placed on the user-defined system by one or more of the computers of the user-defined system. The load may, for example, include a rate of messages generated and transmitted by one or more of the computers of the user-defined system. The analyzed results are then outputted, as indicated at block 84.

In some instances, the dynamic behavior model may be configured to model resource utilization of one or more of the computers, networks and/or bridges of the user-defined system. The modeled resource utilization may include one or more of bandwidth, Central Processing Unit (CPU) usage, disk space usage, memory usage, average wait time, average queue length and network capacity. These are just examples. The one or more resource usage flags may correspond to when a demand for one or more of the modeled resource utilization comes within a predetermined margin of a supply for the corresponding resource.

In some instances, the one or more block parameters of one or more blocks in the user-defined static behavior model may be used in defining the dynamic behavior model. The one or more block parameters of one or more blocks in the user-defined static behavior model may be used in defining stimuli for the plurality of Monte-Carlo simulations. The one or more resource usage flags may correspond to when a demand for one or more resources comes within a predetermined margin of a supply for the corresponding resource.

Figure 5A:
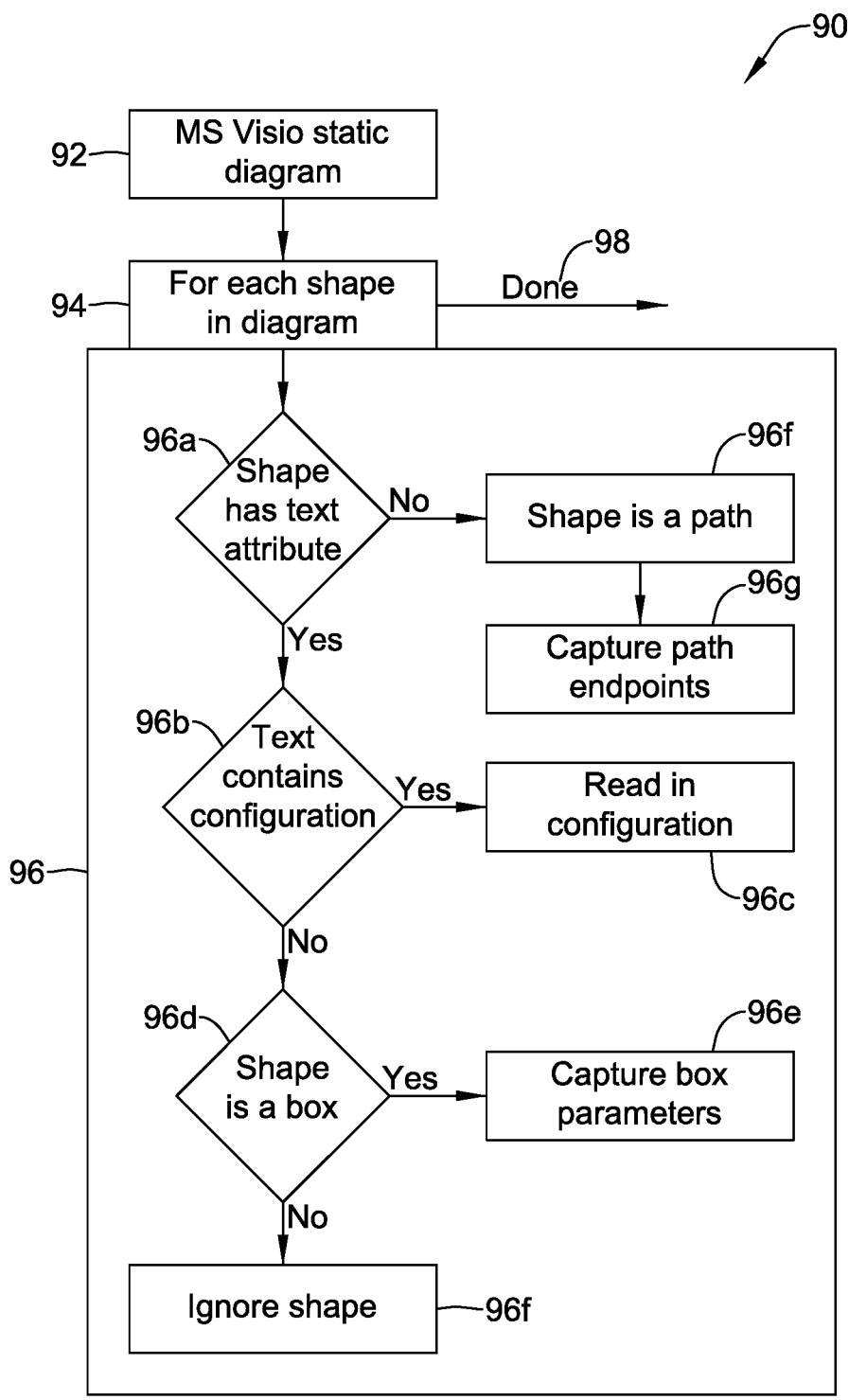
FIGS. 5A and 5B together are a flow diagram showing an illustrative method of converting a user-defined static behavior model into a dynamic behavior model.
Figure 5B:
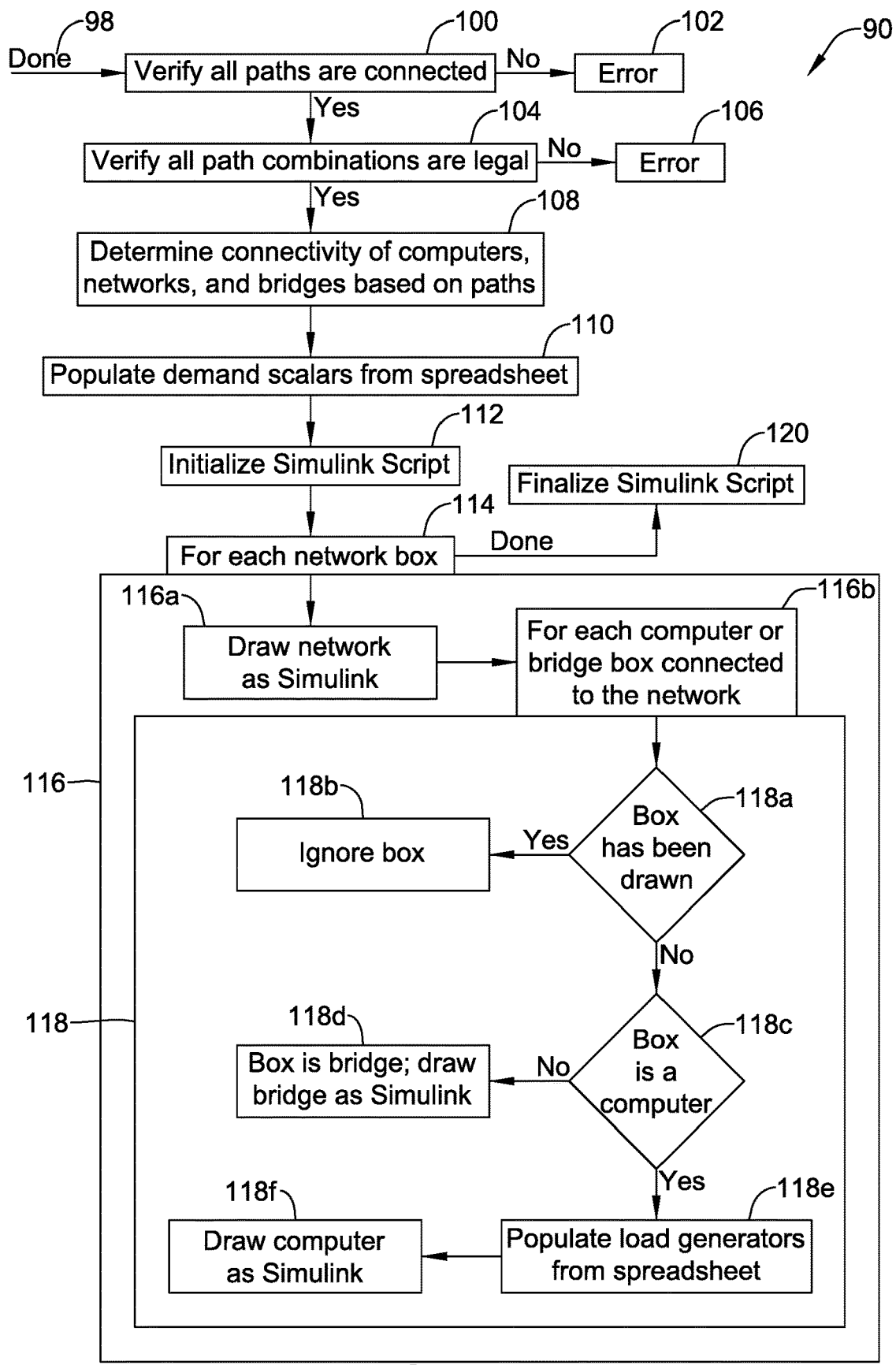

FIGS. 5A and 5B together provide a flow diagram showing an illustrative method 90 for translating a user-defined static behavior model (such as the user-defined static behavior model 30) into a dynamic behavior model that can be run on a Simulink™ simulation. The method 90 may begin with importing a Microsoft Visio™ static behavior diagram, as illustrated at block 92. It will be appreciated that the Visio™ static behavior diagram may include a number of blocks that individually represent computers, networks and bridges. For each of the shapes shown in the static behavior diagram, as shown for example at block 94, a number of steps are carried out. These steps, which are repeated for each of the shapes, are shown as being part of box 96. Within the box 96 are a number of steps. To begin with, control passes to a decision block 96a, where a decision is made as whether the shape has a text attribute. If yes, control passes to a decision block 96b, where a decision is made as to whether the text includes configuration data. If so, control passes to block 96c and the configuration data is read into the system from the included text. Otherwise, control passes to decision block 96d, where a decision is made as to whether the shape is a box. If so, control passes to block 96e, where box parameters are captured. If not, control passes to block 96f, where the shape is ignored. With reference back to decision block 96a, if the decision is made that the shape does not include any text attributes, control passes to block 96f indicating that the particular shape is actually a path. At block 96g, the endpoints of the path are captured.

Once all of the shapes have been processed as indicated in box 96, control passes to DONE 98, which links to FIG. 5B. At block 100, the system verifies whether all of the paths are connected. If not, an error is indicated as shown at block 102. However, if all of the paths are connected, control passes to block 104, where a determination is made as to whether all of the path combinations are legal, meaning that the paths are feasible, and that each device is indicated at communicating with another device that can appropriately communicate with the first device. If there are one or more paths that are not legal, an error is indicated at shown at block 106. If the paths are all legal, control passes to block 108, where the connectivity of each of the computers, networks and bridges in the static behavior diagram are determined based upon the path information that was provided.

At block 110, the demand scalars are populated from a spreadsheet. In some cases, a spreadsheet is used to organize and collect, as an intermediate storage medium, at least some of the configuration data and other data that is connected to each of the blocks in the static behavior diagram. For example, the spreadsheet may store the connections between the Visio™ drawing elements as well as describing how loads on the system may be generated by each of the Visio™ drawing elements. The spreadsheet may list each element that generates a load, and may indicate in another column where that load is aimed. In some cases, a load may include an intrinsic load, which represents the overhead the computer generates just be virtue of being turned on. A load may include an TO ALL load, which is load that a particular computer generates and broadcasts to all other devices. A load may include requests for service that are broadcast to only selected computers, for example. Some computers may transmit to only one other device, while others may communicate to and with any number of different computers or other devices.

In some cases, the spreadsheet may also be used to determine how much load is generated by or for a particular device. To illustrate, a portion of the spreadsheet may include a number of sections each including 3 columns labeled PERIOD, PHASE and DEMAND. The numbers in each column can, for example, specify a sine wave whose period is PERIOD, whose starting point is PHASE (a number that can vary from 0 to 360) and DEMAND (which is the amplitude of the sine wave and represents the load generated each time the sine wave hits the top of its cycle. Because there are a number of sections of 3 columns each, so the load for each row may be the superimposed summation of all of the sine waves (5 for example) which operate wholly independently of each other to generate load that is periodic but unevenly spaced due to different periods, and thus will generate differing amounts of demand. In some cases, the values that go into the aforementioned spreadsheet may derived from direct measurement as calibration data for the system.

Control passes to block 112, where the Simulink™ script is started. Control passes to block 114, where a number of steps are carried out for each of the network boxes as indicated in bloc 116. At block 116a, the network shown in a particular network box is drawn. For each of the computer boxes and bridge boxes that are connected to that particular network box, a number of steps are carried out for each of those computer boxes and network boxes, as indicated at block 116*b*. These steps are included in box 118, which may be considered as being included within the box 116, in a nested fashion.

At decision block 118*a*, a determination is made as to whether the particular box has already been drawn. If so, and as indicated at block 118*b*, the box may be ignored. If it has not been drawn yet, control passes to decision block 118*c* where a decision is made as to whether the box represents a computer. If not, it is determined that the box represents a bridge, and control passes to block 118*d* where the bridge is drawn as a Simulink™ bridge element. Otherwise, if the box is determined to represent a computer, control passes to block 118*e* and the load generators are populated from the spreadsheet (the same spreadsheet as that referenced above with respect to block 110). It will be appreciated that drawing a network, computer or bridge in Simulink™ refers to converting a single box in the Visio™ diagram to a set of blocks in Simulink™. A network, a computer and a bridge each have their own base model in Simulink™ that gets blocks added to it depending on what else devices are connected to it (as indicated for example in the Visio™ diagram and as indicated in the aforementioned load generator spreadsheet. Control then passes to block 118*f*, where the computer is drawn as a Simulink™ computer element. Once all of the devices in each network have been processed, and all of the networks (with associated devices) have been processed, control passed to block 120 where the Simulink™ script is finalized. The Simulink™ script is now ready for running simulations.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method of modeling dynamic system performance of a user-defined static behavior model, the method comprising:
    providing a user interface that enables a user to create the user-defined static behavior model of a user-defined system of computers, networks and/or bridges;
    providing a library of blocks that each represent a computer, a network and/or a bridge for the user to use in defining the user-defined static behavior model, wherein the user connects selected blocks of the library of blocks to define the user-defined static behavior model, at least some of the blocks in the library of blocks include one or more block parameters that are user definable;
    converting the static behavior model into a dynamic behavior model that is compatible with a simulator;
    reading the dynamic behavior model into the simulator;
    running a plurality of Monte-Carlo simulations on the dynamic behavior model to produce a plurality of simulation outputs;
    analyzing the plurality of simulation outputs to identify one or more resource usage flags in the user-defined system of computers, networks and/or bridges; and
    outputting analyzed results.

2. The method of claim 1, wherein the one or more block parameters of one or more blocks in the user-defined static behavior model are used in defining the dynamic behavior model.

3. The method of claim 1, wherein the one or more block parameters of one or more blocks in the user-defined static behavior model are used in defining stimuli for the plurality of Monte-Carlo simulations.

4. The method of claim 1, wherein the one or more resource usage flags include a resource overload condition of one or more of the computers, networks and/or bridges in the user-defined system.

5. The method of claim 1, wherein the one or more resource usage flags include a resource underload condition of one or more of the computers, networks and/or bridges in the user-defined system.

6. The method of claim 1, wherein the plurality of Monte-Carlo simulations vary one or more stimuli presented to the dynamic behavior model, wherein the one or more stimuli are uncorrelated across the plurality of Monte-Carlo simulations.

7. The method of claim 6, wherein the one or more stimuli are based on a seed value.

8. The method of claim 1, wherein the plurality of Monte-Carlo simulations vary one or more stimuli presented to the dynamic behavior model, wherein at least some of the one or more stimuli reflect a load placed on the user-defined system by one or more of the computers of the user-defined system.

9. The method of claim 8, wherein the load comprises a rate of messages generated and transmitted by one or more of the computers of the user-defined system.

10. The method of claim 1, wherein the dynamic behavior model is configured to model resource utilization of one or more of the computers, networks and/or bridges of the user-defined system.

11. The method of claim 10, wherein the modeled resource utilization includes one or more of bandwidth, Central Processing Unit (CPU) usage, disk space usage, memory usage and network capacity.

12. The method of claim 10, wherein the one or more resource usage flags corresponds to when a demand for one or more of the modeled resource utilization comes within a predetermined margin of a supply for the corresponding resource.

13. A system for modeling dynamic system performance of a user-defined system that includes a plurality of computers that are operably coupled via communication connections, the system comprising:
    a user interface;
    a processing unit operably coupled to the user interface and configured to:
    accept from user via the user interface a user-defined static behavior model for the user-defined system;
    convert the user-defined static behavior model into a dynamic behavior model;
    run a plurality of Monte-Carlo simulations on the dynamic behavior model to produce a plurality of simulation outputs;
    analyze the plurality of simulation outputs to identify one or more resource usage flags for one or more of the plurality of computers and/or communication connections of the user-defined system; and
    output analyzed results.

14. The system of claim 13, wherein the processing unit comprises a personal computer.

15. The system of claim 13, wherein the processing unit comprises a cloud-based computer.

16. The system of claim 13, wherein the user interface is further configured to enable the user to use a library of blocks that each represent a computer, a network and/or a bridge for to define the user-defined static behavior model.

17. A non-transient, computer-readable storage medium having instructions stored thereon that when executed by a computer system cause the computer system to:
provide a user interface that enables a user to create a user-defined static behavior model of a user-defined system of computers, networks and/or bridges;
provide a library of blocks that each represent a computer, a network and/or a bridge for the user to use in defining the user-defined static behavior model, wherein the user connects selected blocks of the library of blocks to define the user-defined static behavior model, at least some of the blocks in the library of blocks include one or more block parameters that are user definable;
convert the user-defined static behavior model into a dynamic behavior model that is compatible with a simulator;
read the dynamic behavior model into the simulator;
run a plurality of Monte-Carlo simulations on the dynamic behavior model to produce a plurality of simulation outputs;
analyze the plurality of simulation outputs to identify one or more resource usage flags in the user-defined system of computers, networks and/or bridges; and
output analyzed results.

18. The non-transient, computer-readable storage medium of claim 17, wherein the one or more block parameters of one or more blocks in the user-defined static behavior model are used in defining the dynamic behavior model.

19. The non-transient, computer-readable storage medium of claim 17, wherein the one or more block parameters of one or more blocks in the user-defined static behavior model are used in defining stimuli for the plurality of Monte-Carlo simulations.

20. The non-transient, computer-readable storage medium of claim 17, wherein one or more resource usage flags corresponds to when a demand for one or more resources comes within a predetermined margin of a supply for the corresponding resource.

* * * * *